US008640915B2

(12) United States Patent
Arcega

(10) Patent No.: US 8,640,915 B2

(45) Date of Patent: Feb. 4, 2014

(54) GUMBALL MACHINE THAT DISPENSES MULTIPLE GUMBALLS

(75) Inventor: Francis M Arcega, Manila (PH)

(73) Assignee: Sweet N Fun, Ltd., Hong Kong (HK)

( * ) Notice: Subject to any disclaimer, the term of this patent is extended or adjusted under 35 U.S.C. 154(b) by 6 days.

(21) Appl. No.: 13/397,871

(22) Filed: Feb. 16, 2012

(65) Prior Publication Data

US 2013/0213994 A1 Aug. 22, 2013

(51) Int. Cl.

| | |
|---|---|
| ***G07F 11/16*** | (2006.01) |
| ***B65G 59/00*** | (2006.01) |
| ***B65D 83/04*** | (2006.01) |

(52) U.S. Cl.

USPC ........... 221/196; 221/155; 221/277; 221/264; 221/120

(58) Field of Classification Search

USPC ................................................. 221/119, 120

See application file for complete search history.

(56) References Cited

U.S. PATENT DOCUMENTS

| | | | |
|---|---|---|---|
| 3,706,395 A * | 12/1972 | Havener et al. | 221/119 |
| 5,176,290 A * | 1/1993 | Schwarzli | 221/203 |
| 5,259,532 A | 11/1993 | Schwarzli | |
| 5,261,564 A * | 11/1993 | Yelvington | 221/113 |
| 5,339,985 A * | 8/1994 | Perez | 221/151 |
| 5,443,179 A | 8/1995 | Palmer et al. | |
| D364,428 S * | 11/1995 | Caron | D21/310 |
| 5,632,490 A * | 5/1997 | Brown | 273/350 |
| 5,794,816 A | 8/1998 | Pliler et al. | |
| 5,833,117 A * | 11/1998 | Kovens et al. | 221/24 |
| 5,897,022 A * | 4/1999 | Mann | 221/24 |
| 5,911,299 A | 6/1999 | Aspnes et al. | |
| 6,056,151 A * | 5/2000 | Peery et al. | 221/24 |
| 6,194,995 B1 * | 2/2001 | Gates | 340/309.7 |
| 6,520,374 B1 * | 2/2003 | Chang | 221/113 |
| 6,530,499 B1 * | 3/2003 | Coleman et al. | 221/24 |
| 6,536,623 B1 | 3/2003 | Sutcliffe | |
| 6,935,530 B2 | 8/2005 | Semeniuk et al. | |
| 7,377,401 B2 | 5/2008 | Humphrey | |

* cited by examiner

*Primary Examiner* — Michael K Collins

(74) *Attorney, Agent, or Firm* — Raymond Sun

(57) ABSTRACT

A gumball machine has a gumball container that holds a plurality of gumballs, a neck portion coupled to the gumball container and having an actuator and a gumball dispensing assembly that is coupled to the actuator for simultaneously releasing a plurality of gumballs from the gumball container when the actuator is actuated. The gumball machine also has a plurality of cylindrical supports, each having an upper end coupled to the neck portion, and a lower end having a side opening. A base is coupled to the lower end of each cylindrical support and has a bottom portion that is seated on a surface. Each side opening of each cylindrical support is positioned adjacent a ramp such that a gumball travelling through the cylindrical support is dispensed via the side opening to the ramp.

6 Claims, 3 Drawing Sheets

GUMBALL MACHINE THAT DISPENSES MULTIPLE GUMBALLS

BACKGROUND OF THE INVENTION

1. Field of the Invention

The present invention relates to gumball machines, and in particular, to a gumball machine that dispenses multiple gumballs.

2. Description of the Prior Art

Gumball machines have been popular novelty items for a long time. Children and adults alike have enjoyed dispensing a gumball from a spherical transparent container. Some gumball machines have even been provided with tracks along which the gumball can travel while being dispensed.

SUMMARY OF THE DISCLOSURE

It is an object of the present invention to provide a gumball machine that provides additional fun and novelty for the user.

In order to accomplish the objects of the present invention, the gumball machine according to the present invention includes a gumball container that holds a plurality of gumballs, a neck portion coupled to the gumball container and having an actuator, and a gumball dispensing assembly that is coupled to the actuator for simultaneously releasing a plurality of gumballs from the gumball container when the actuator is actuated. The gumball machine also has a plurality of cylindrical supports, each having an upper end coupled to the neck portion, and a lower end having a side opening. A base is coupled to the lower end of each cylindrical support and has a bottom portion that is seated on a surface, the base further including a ramp. Each side opening of each cylindrical support is positioned adjacent the ramp such that a gumball travelling through the cylindrical support is dispensed via the side opening to the ramp.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
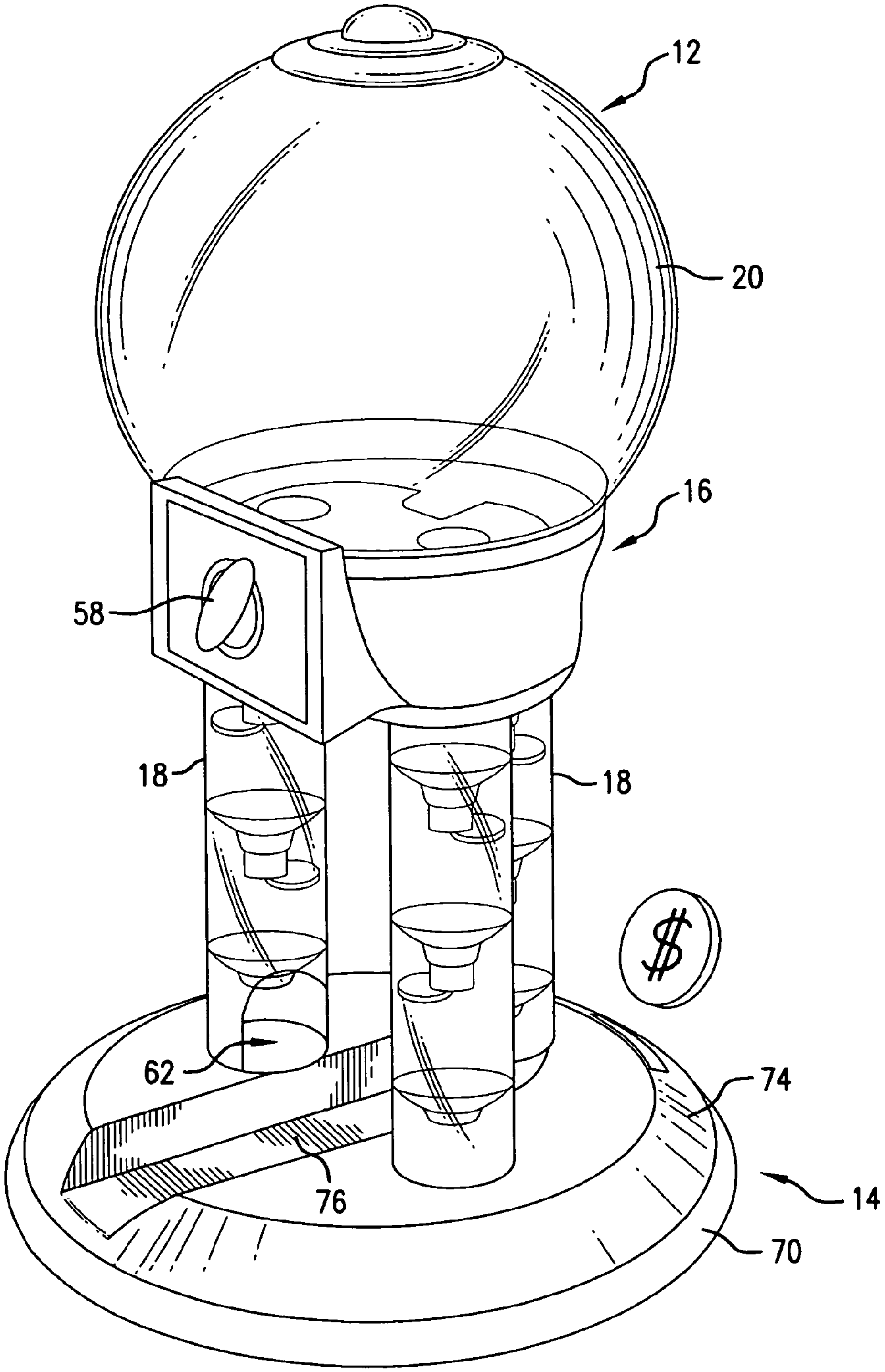
FIG. 1 is a perspective view of a gumball machine according to the present invention.
Figure 2:
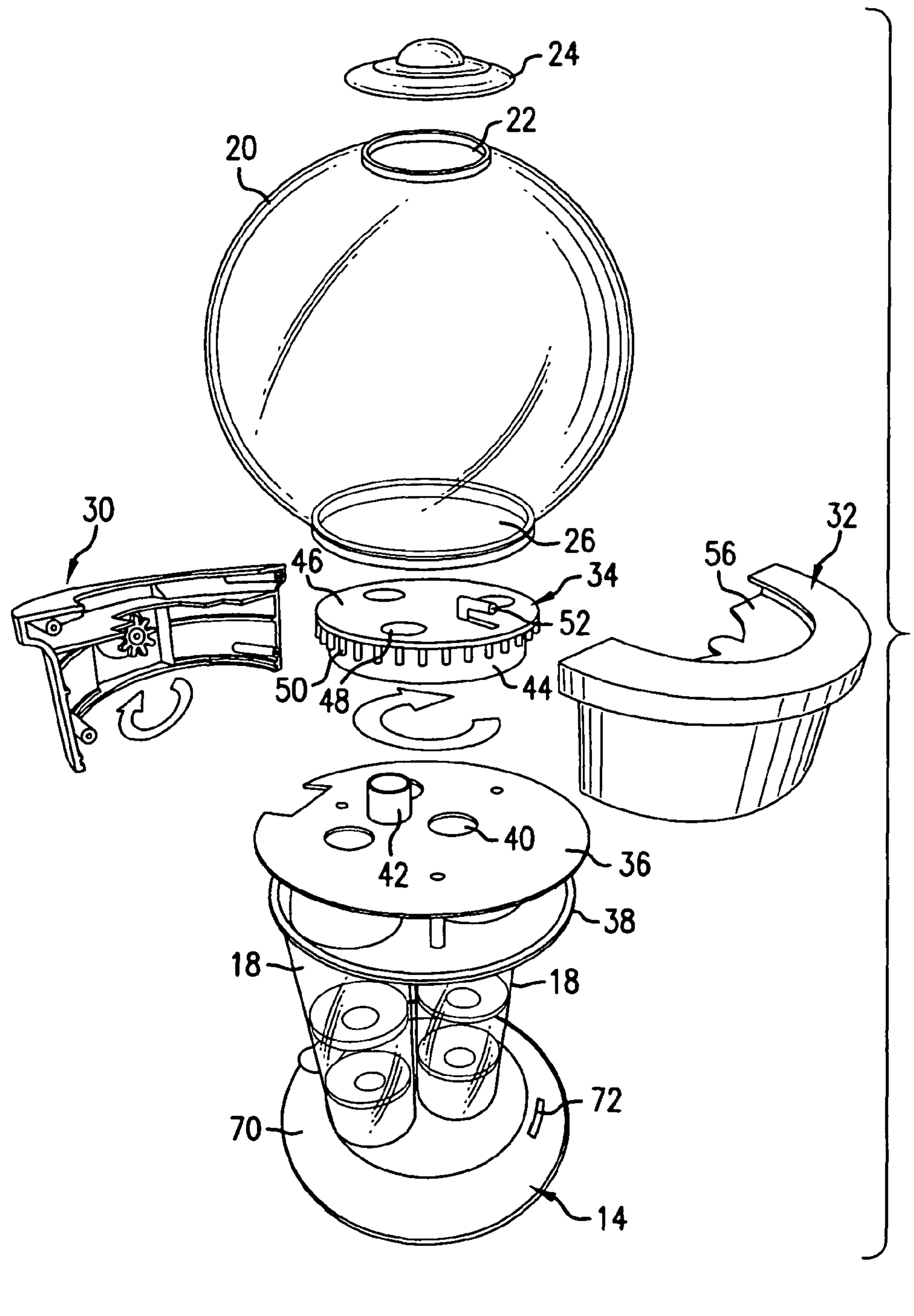
FIG. 2 is an exploded view of the gumball machine of FIG. 1.
Figure 3:
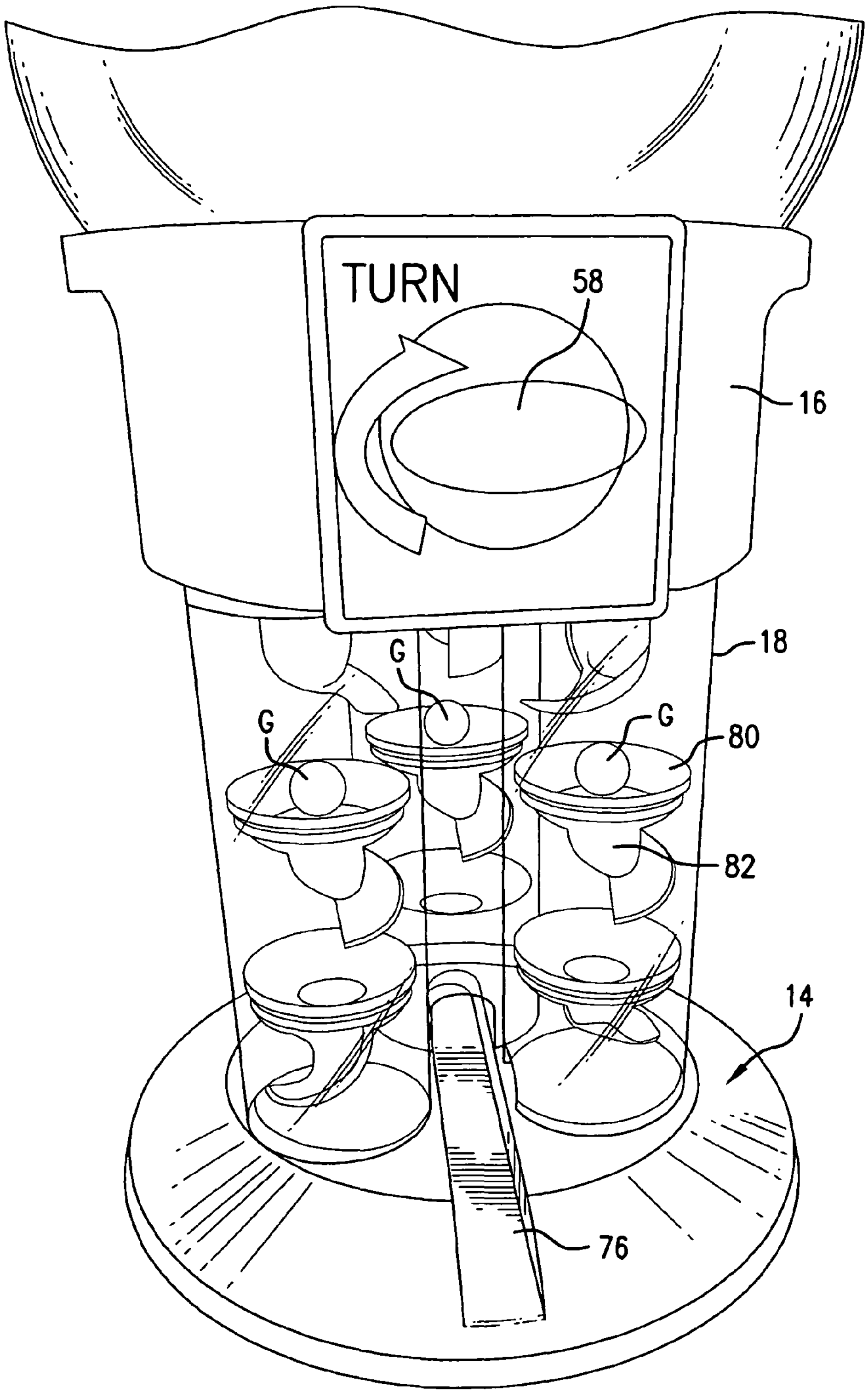
FIG. 3 illustrates the simultaneous dispensing of three gumballs of the gumball machine of FIG. 1.

Referring to FIGS. 1-3, the gumball machine 10 of the present invention has a gumball container 12, a base 14, a neck portion 16 secured to the bottom of the gumball container 12, and a plurality of cylindrical supports 18 positioned between the neck portion 16 and the base 14.

The gumball container 12 has a spherical housing 20 that can be made of a transparent material, such as plastic. Gumballs G are stored in the container 12. Even though the housing 20 is shown as being spherical in configuration, it can be provided in any desired shape or size, and can even be configured as an object (e.g., an animal, a cup, etc.). A top opening 22 is provided at the top of the housing 20 to provide access to the user for adding gumballs, and a cover or lid 24 is provided to cover the top opening 22. A bottom opening 26 is provided at the bottom of the housing 20.

The neck portion 16 is secured to the gumball container 12, and includes a gumball dispensing assembly that will be described below in connection with FIGS. 2-3. Referring now to FIGS. 1 and 2, the neck portion 16 has two shell portions 30 and 32 that enclose the components of the gumball dispensing assembly. These internal components include a turntable 34 and two plates 36 and 38. More specifically, a bottom plate 38 defines the bottom or base of the neck portion 16, and has three holes, each of which has a transparent cylindrical support 18 extending therethrough. A top plate 36 has three openings 40, each aligned with a corresponding hole on the bottom plate 38. The top of each transparent cylindrical support 18 is secured to a corresponding opening 40. A cylindrical shaft 42 extends through the plates 36 and 38, and has an upper end that is adapted to receive a central bore (not shown) of the turntable 34. The turntable 34 has a body portion 44 and a platform 46. Three openings 48 are provided on the platform 46, and the peripheral edge of the platform 46 has a plurality of teeth 50. The platform 46 is sized and configured to fit inside and cover the bottom opening 26 of the housing 20. A hook member 52 extends from the platform 46 into the housing 20 and functions to hook or push gumballs G inside the housing 20 to ensure that the gumballs G move and flow as other gumballs are being dispensed.

Each shell portion 30, 32 has a shelf portion 56 on which the teeth 50 are supported. A rotatable knob 58 is provided on the exterior of the shell portion 30, and is connected via a shaft (not shown) that extends through the shell portion 30 to a toothed wheel 60 that is positioned inside the shell portion 30. The toothed wheel 60 has teeth that engage the teeth 50 of the turntable 34. As the user turns the knob 58, the teeth on the wheel 60 engage the teeth 50 on the turntable 34, causing the turntable 34 to rotate. As the turntable 34 rotates, the openings 48 on the platform 46 will become aligned with the openings 40 on the plate 36. When these openings 48, 40 are aligned, a gumball stored in the housing 20 will pass through each pair of aligned openings 48, 40, and fall via gravity through a corresponding transparent cylindrical support 18.

Each cylindrical support 18 is tubular in nature and extends from the neck portion 16 to a base 14. Each cylindrical support 18 can also be transparent so that the user can view a gumball falling through the cylindrical support 18. The upper end of each cylindrical support 18 secured to the plate 36 of the neck portion 16, and its lower end is secured to the base 14. The base 14 has an enlarged bottom section 70 that is adapted to be seated on the ground or a flat surface, and a body 74 extending from the bottom section 70. The base 14 can function as a bank for collecting coins. The coins can be inserted through a slot 72 provided on the body 74. A removable cover (not shown) can be provided at the bottom of the bottom section 70 for providing access to the coins stored in the base 14. The body 74 has a ramp 76 provided on its top surface. A side opening 62 is provided adjacent the bottom of each cylindrical support 18 adjacent the ramp 76, so that a gumball that has fallen through the cylindrical support 18 can roll naturally on to the ramp 76 to be delivered to the user.

Different novelty items can be secured inside each cylindrical support 18. For example, FIGS. 1-3 show a plurality of hemispherical bowl-shaped plates 80 secured to the inner wall of the cylindrical supports 18. The bowl-shaped plate 80 has an opening at the center of its bottom, and is shaped so that a gumball entering the cylindrical support 18 from the top will contact the bowl-shaped plate 80, and the hemispherical shape of the bowl-shaped plate 80 will cause the gumball to travel towards the center thereof until it reaches the opening where it can then fall (via the force of gravity) to a delivery ramp 82, and then fall towards the next bowl-shaped plate 80 (or other novelty item). Even though FIGS. 1-3 illustrate the novelty item as being the bowl-shaped plate 80, it is possible to provide other novelty items, or to have different novelty items (e.g., spiral ladders, paddles, spiral passages, etc.) within the same cylindrical support 18.

In operation, the user turns the knob 58, causing the turntable 34 to rotate until pairs of openings 48, 40 are aligned. Three separate gumballs will fall through the three pairs of aligned openings 48, 40, and each gumball travels downwardly through a separate cylindrical support 18 to be delivered to the ramp 76.

Thus, the present invention provides a multi-purpose gumball machine 10 which can simultaneously dispense a plurality of gumballs G. The gumball machine 10 can also function as a coin bank.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A gumball machine, comprising:

a gumball container that holds a plurality of gumballs;

a neck portion coupled to the gumball container, the neck portion having an actuator, and a gumball dispensing assembly that is coupled to the actuator for simultaneously releasing a plurality of gumballs from the gumball container when the actuator is actuated;

a plurality of cylindrical supports, each having an upper end coupled to the neck portion, and a lower end having a side opening, with a novelty item secured inside at least one cylindrical support;

a base coupled to the lower end of each cylindrical support and having a bottom portion that is seated on a surface, the base further including a ramp, wherein each side opening of each cylindrical support is positioned adjacent the ramp such that a gumball travelling through the cylindrical support is dispensed via the side opening to the ramp; and wherein the gumball dispensing assembly includes:

a turntable having a plurality of openings, the turntable coupled to the actuator;

a plate having a plurality of openings, with an upper end of each cylindrical support aligned with one of the openings of the plate; and wherein rotation of the turntable causes the openings of the turntable to be aligned with corresponding openings of the plate.

2. The machine of claim 1, wherein the base has an opening through which coins can be inserted for storage in the base.

3. The machine of claim 1, wherein each cylindrical support is transparent.

4. A gumball machine, comprising:

a gumball container that holds a plurality of gumballs;

a neck portion coupled to the gumball container, the neck portion having an actuator, and a gumball dispensing assembly that is coupled to the actuator, the gumball dispensing assembly including:

a turntable having a plurality of turntable openings, the turntable coupled to the actuator; and a plate having a plurality of plate openings;

a plurality of transparent cylindrical supports, each having an upper end coupled to one of the openings of the plate, and a lower end having a side opening; and a base coupled to the lower end of each cylindrical support and having a bottom portion that is seated on a surface, the base further including a ramp;

wherein actuation of the actuator causes the turntable to rotate, which causes the turntable openings to be aligned with corresponding plate openings so that a plurality of gumballs are simultaneously released from the gumball container into the corresponding cylindrical supports; and wherein each side opening of each cylindrical support is positioned adjacent the ramp such that a gumball travelling through the cylindrical support is dispensed via the side opening to the ramp.

5. The machine of claim 4, further including a novelty item secured inside at least one cylindrical support.

6. The machine of claim 4, wherein the base has an opening through which coins can be inserted for storage in the base.

* * * * *